United States Patent
Chen

(10) Patent No.: US 7,490,874 B2
(45) Date of Patent: Feb. 17, 2009

(54) LOCK DEVICE FOR FOLDABLE ELECTRONIC APPARATUS

(75) Inventor: Wu-Yung Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1 day.

(21) Appl. No.: 11/773,973

(22) Filed: Jul. 6, 2007

(65) Prior Publication Data

US 2008/0087050 A1    Apr. 17, 2008

(30) Foreign Application Priority Data

Oct. 13, 2006    (CN) .................. 2006 1 0063095

(51) Int. Cl.
*E05C 3/06*    (2006.01)
*E05C 3/16*    (2006.01)

(52) U.S. Cl. .............. 292/214; 292/197; 292/198; 292/203; 292/210; 292/215; 292/304; 292/DIG. 11; 361/683

(58) Field of Classification Search .......... 292/194, 292/195, 197, 198, 202, 203, 210, 211, 214, 292/215, 219, 220, 222, 228, 304, DIG. 11; 361/683
See application file for complete search history.

(56) References Cited

U.S. PATENT DOCUMENTS

| | | | | |
|---|---|---|---|---|
| 5,751,545 A * | 5/1998 | Jung | ........................... | 361/683 |
| 6,122,152 A * | 9/2000 | Goto et al. | ..................... | 361/1 |
| 6,125,040 A * | 9/2000 | Nobuchi et al. | ............. | 361/726 |
| 6,256,194 B1 * | 7/2001 | Choi et al. | .................. | 361/683 |
| 6,563,699 B1 * | 5/2003 | Choi | .......................... | 361/683 |
| 6,847,520 B2 * | 1/2005 | Hashimoto | .................. | 361/680 |
| 6,927,972 B1 * | 8/2005 | Wang et al. | ................. | 361/683 |
| 6,965,512 B2 * | 11/2005 | Huang et al. | ................ | 361/683 |
| 7,164,578 B2 * | 1/2007 | Wang et al. | ................. | 361/683 |
| 7,173,816 B2 * | 2/2007 | Song | .......................... | 361/683 |
| 7,261,331 B2 * | 8/2007 | Lin | ............................ | 292/116 |
| 7,261,573 B2 * | 8/2007 | Lin et al. | .................... | 439/135 |
| 2003/0223190 A1 * | 12/2003 | Hashimoto | ................. | 361/683 |

FOREIGN PATENT DOCUMENTS

CN    02287394.5    12/2003

* cited by examiner

*Primary Examiner*—Carlos Lugo
(74) *Attorney, Agent, or Firm*—Frank R. Niranjan

(57) ABSTRACT

A lock device is used for a foldable electronic apparatus. The lock device is mounted on a display unit of the electronic apparatus. The lock device includes a rotatable bolt, an actuator, and an elastic bolt holder. The rotatable bolt is rotatably mounted on the display unit and includes two latch tenons. The elastic bolt holder connects the actuator and the rotatable bolt and keeps the rotatable bolt at a first direction. Movement of the actuator causes the rotatable bolt to rotate from the first direction to a second direction. The lock device can couples with a notch successfully even assemble error exists.

3 Claims, 7 Drawing Sheets

LOCK DEVICE FOR FOLDABLE ELECTRONIC APPARATUS

BACKGROUND

1. Technical Field

The present invention relates to a lock device, particularly to a lock device for a foldable electronic apparatus.

2. General Background

An electronic apparatus that have a folding member such as a notebook computer generally include an upper lid, a base, and a lock device used to anchor the upper lid to the base.

Referring to FIG. 7, a conventional lock device 200 for a notebook computer 500 is shown. The computer 500 includes a display unit 510 and a main body 520 which are foldably attach to each other. The lock device 200 is housed in the display unit 510, and includes an actuator 210, a hook bar 220, and an elastic bar holder 230. The hook bar 220 is fastened with the actuator 210 and the elastic bar holder 230, and includes two latch tenons 221. When the display unit 510 is closed, the latch tenons 221 are fixed into notches 521 of the main body 520. The elastic bar holder 230 pushes the latch tenons 221 to maintain in an engaging condition with the notches 521. To open the display unit 510, the actuator 210 is moved transversely to push the hook bar 220, the latch tenons 221 will slide free of the notches 521 to release the engaging condition between the latch tenons 221 and the notches 521.

While the latch tenons 221 being fixed into or releasing from the notches 521, the latch tenons 221 can only move linearly. The length of opening of the notches 521 must be wider than the length of the latch tenons 221 in the moving direction. If assembling error exists, and the latch tenons 221 are fully positioned at the opening of the notches 521 after the display unit 510 is closed, the latch tenons 221 can't be fixed into the notches 521.

Therefore, what is needed is a lock device which engages with a notch successfully even assembling error exists.

SUMMARY

A kind of lock device is disclosed. The lock device is used for a foldable electronic apparatus. The electronic apparatus includes a display unit. The lock device is mounted on the display unit. The lock device includes a rotatable bolt, an actuator, and an elastic bolt holder. The rotatable bolt is rotatably mounted on the display unit and includes two latch tenons. The actuator is movable reciprocally. The elastic bolt holder connects the actuator and the rotatable bolt and keeps the rotatable bolt at a first direction. Movement of the actuator causes the rotatable bolt to rotate from the first direction to a second direction.

Further features and advantages will be provided or will become apparent in the course of the following detailed description.

DETAILED DESCRIPTION OF THE EMBODIMENT

Figure 1:
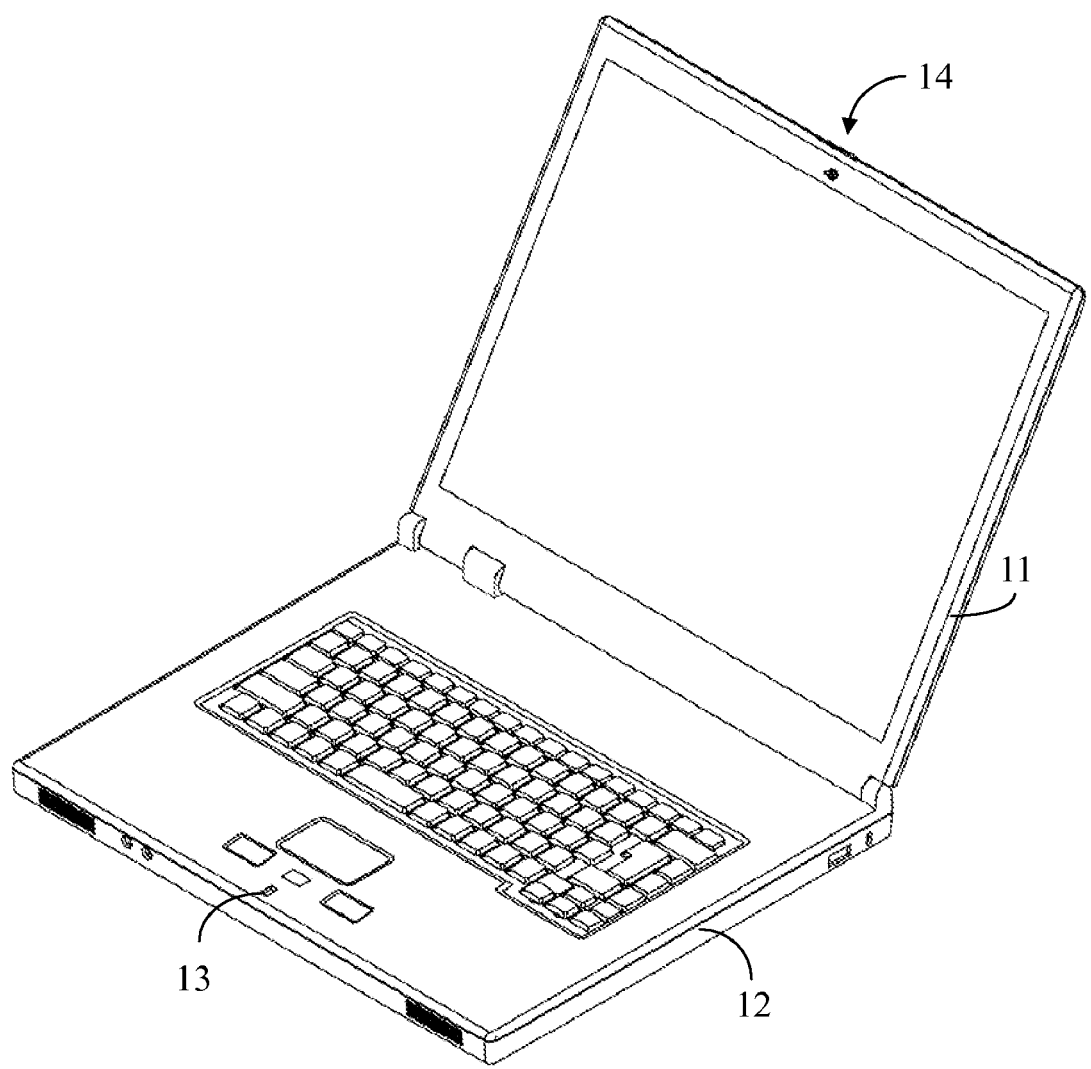
FIG. 1 is a schematic, isometric view of a notebook computer in an opened condition according to a preferred embodiment of the present invention.
Figure 2:
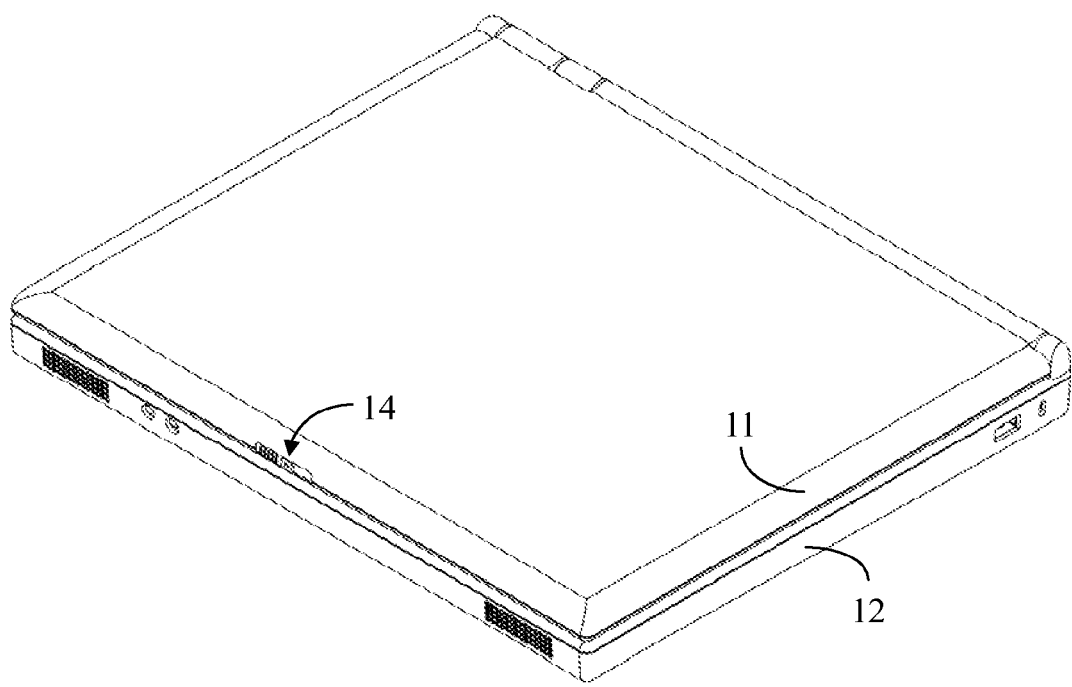
FIG. 2 is a schematic, isometric view of the notebook computer of FIG. 1 in a closed condition.

Referring to FIGS. 1, 2, an electronic apparatus such as a notebook computer 10 is disclosed. The notebook computer 10 includes a display unit 11 and a main body 12 is disclosed. The notebook computer 10 further includes a lock device 14 assembled in the display unit 11 and a notch 13 defined on the main body 12.

Figure 3:
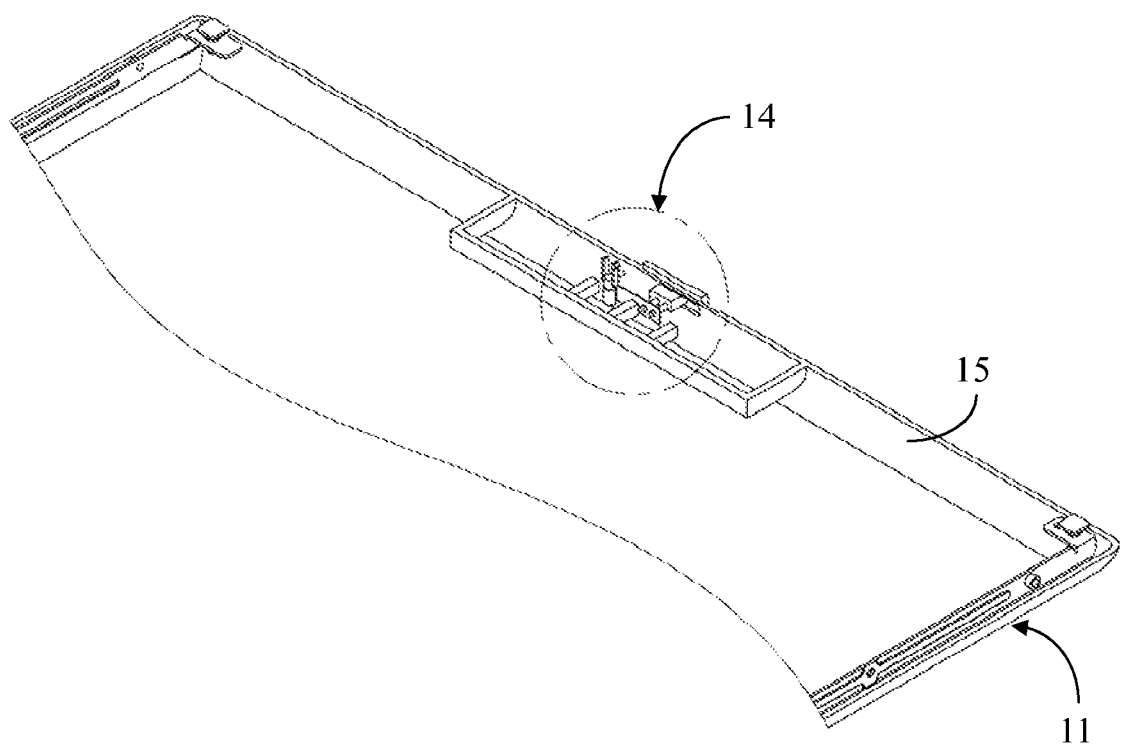
FIG. 3 is a schematic, enlarged view of a lock device assembled on the notebook computer of FIG. 1 according to a preferred embodiment of the present invention.
Figure 4:
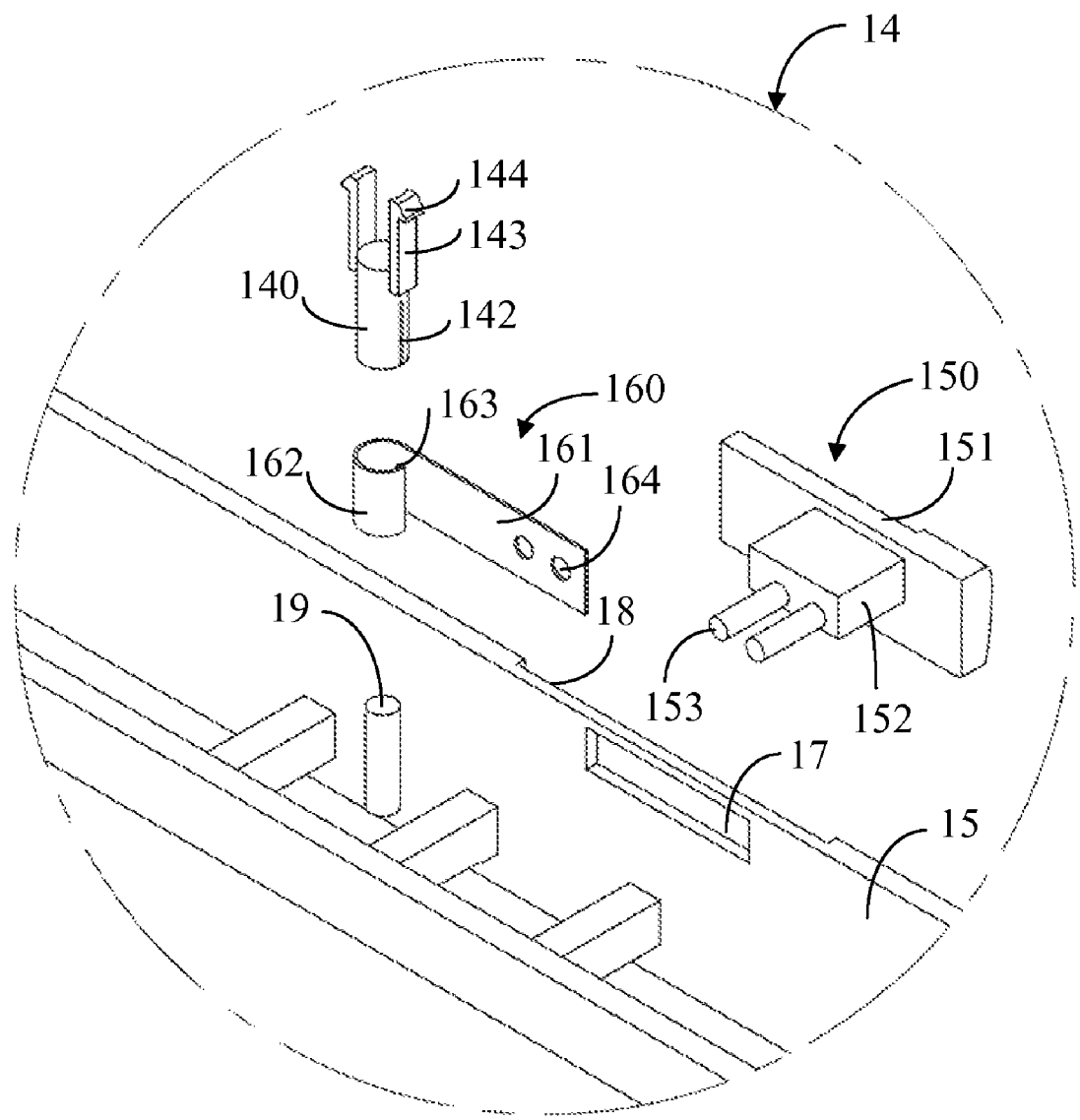
FIG. 4 is a schematic, further enlarged exploded view of the lock device of FIG. 3.

Referring to FIGS. 3, 4, the lock device 14 includes an actuator 150, an elastic bolt holder 160, and a rotatable bolt 140.

A pivot hole (not shown in FIGS.) is defined at a bottom of the rotatable bolt 140 and a bolt holding groove 142 is defined on a side of the rotatable bolt 140. The bolt holding groove 142 extends vertically from a bottom end of the rotatable bolt 140. The rotatable bolt 140 further includes two latch tenons 144 extending in a predetermined direction, each supported by a support 143. Each latch tenon 144 forms a sloped surface on its outer side.

The elastic bolt holder 160 includes a holder body 162, a hook 163 extending inwardly from an end of the holder body 162, and a handle 161 extending from another end of the holder body 162. The handle 161 defines two holes 164.

The actuator 150 includes a plate 151, a slide support 152 disposed on the plate 151, and two handle mounts 153 extending from the slide support 152.

Figure 5:
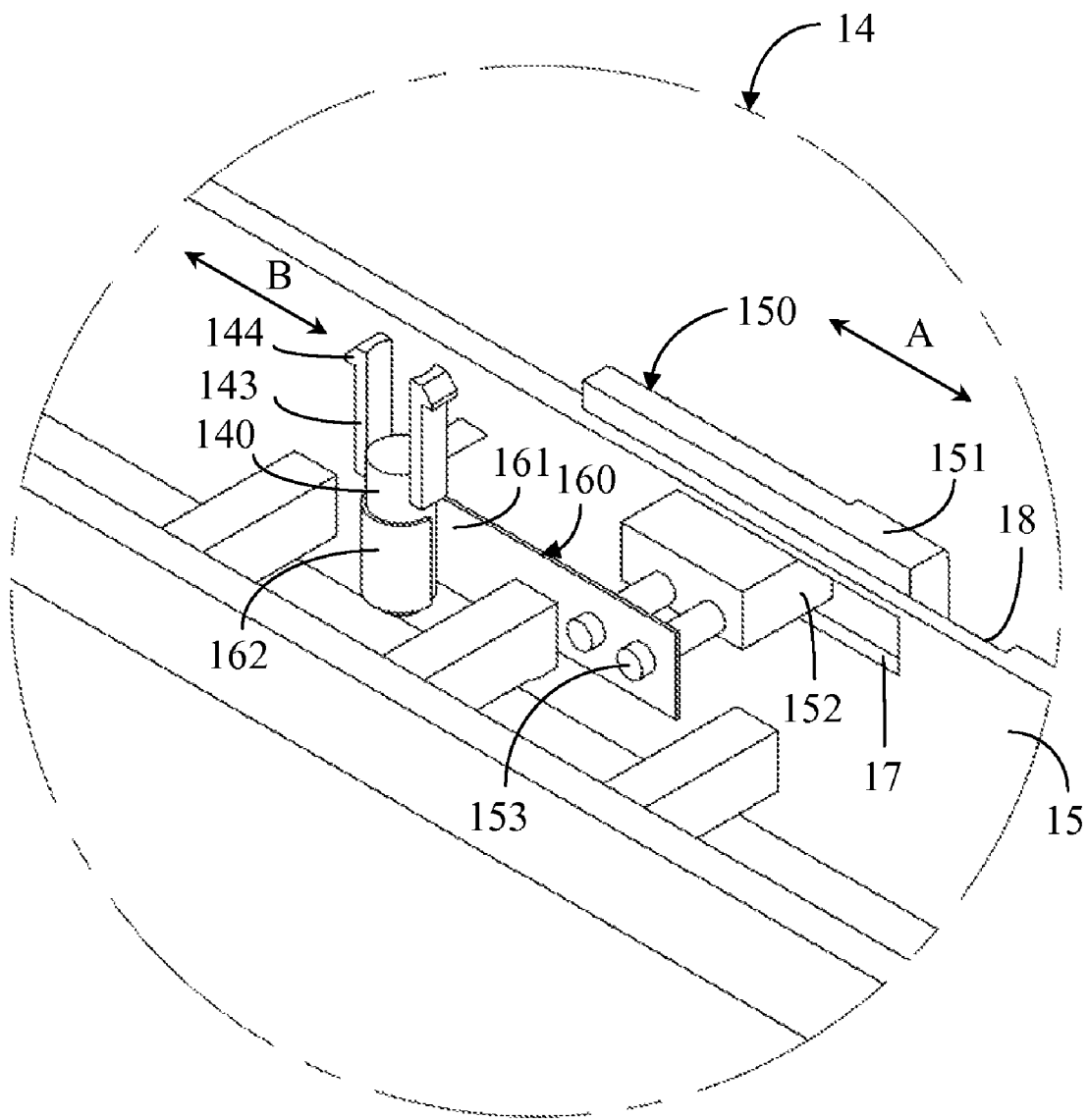
FIG. 5 is a schematic, further enlarged view of the lock device of FIG. 3 located at a first direction.

Referring to FIG. 5, the pivot hole of the rotatable bolt 140 is inserted with a pivot shaft 19 of the display unit 11. The latch tenons 144 are exposed from the display unit 11 (See FIG. 1 and below for further explanation). The holder body 162 of the elastic bolt holder 160 encloses the rotatable bolt 140, and the hook 163 wedges into the bolt holding groove 142. The plate 151 of the actuator 150 is received in a depression 18 defined on a front side 15 of the display unit 11 and is reciprocating movable in a direction A. The slide support 152 and the handle mounts 153 protrude through an opening 17 defined in the depression 18. The handle mounts 153 are correspondingly inserted into the holes 164 of the elastic bolt holder 160.

Referring to FIG. 1, the notch 13 is used for engaging with the latch tenons 144. An opening of the notch 13 is a rectangle having two long sides and two short sides. The short sides or width of the opening is less than a distance between the outer edges of the two latch tenons 144. The long sides or length of the opening is greater than the distance between the outer edges of the two latch tenons 144.

Referring to FIG. 5, an elastic force of the elastic bolt holder 160 keeps the latch tenons 144 at a first direction B. The first direction B is parallel to the short sides of the opening of the notch 13. In this embodiment of the present invention, the first direction B is parallel to the direction A. When the display unit 11 is folding into the main body 12, the sloped surfaces of the latch tenons 144 guide the latch tenons 144 to wedge into the notch 13. The supports 143 deform and thus the latch tenons 144 pass through the opening of the notch 13. When the latch tenons 144 engage with the notch 13, the display unit 11 can't be opened from the main body 12.

Figure 6:
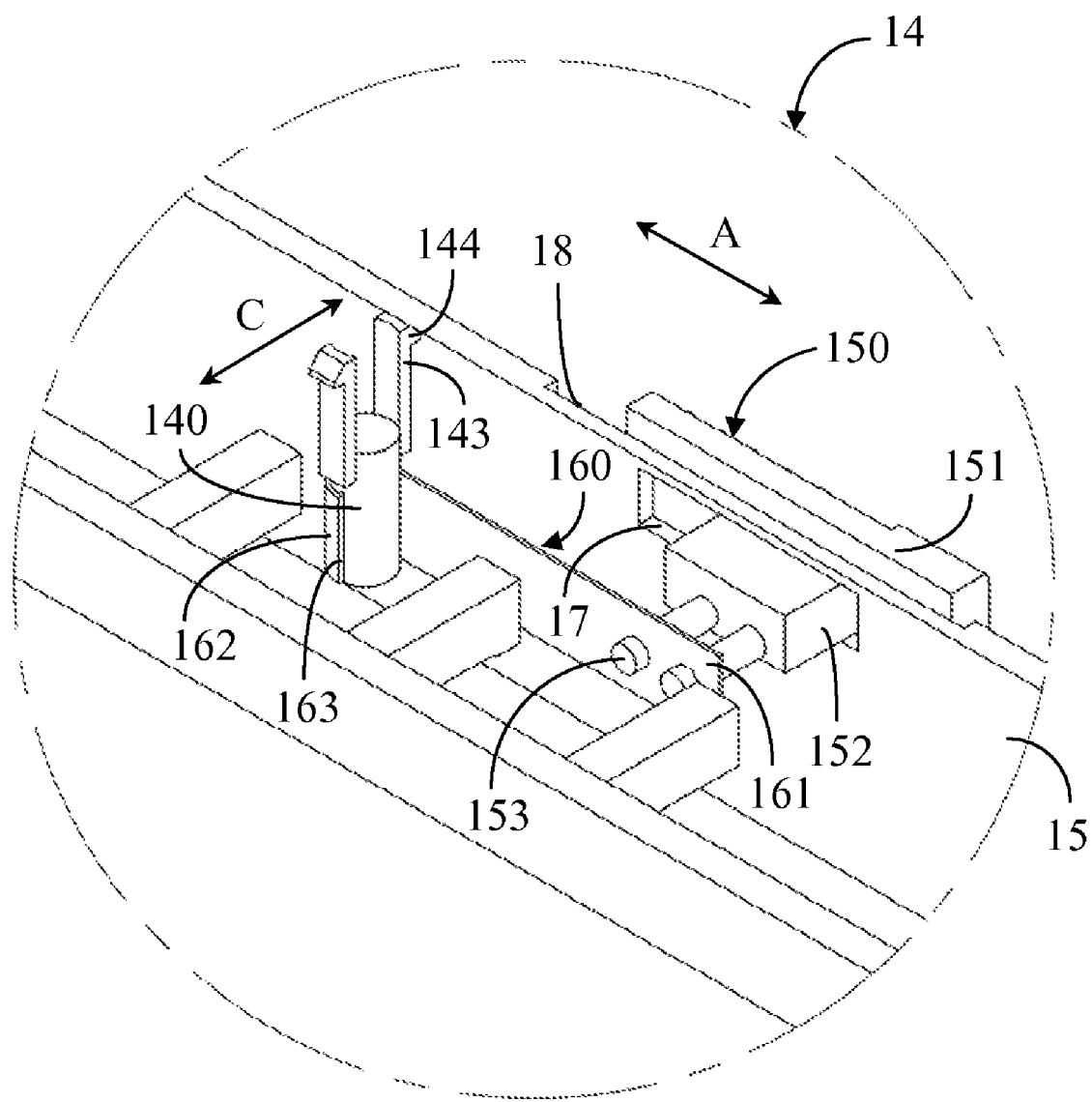
FIG. 6 is a schematic, further enlarged view of the lock device of FIG. 3 located at a second direction.
Figure 7:
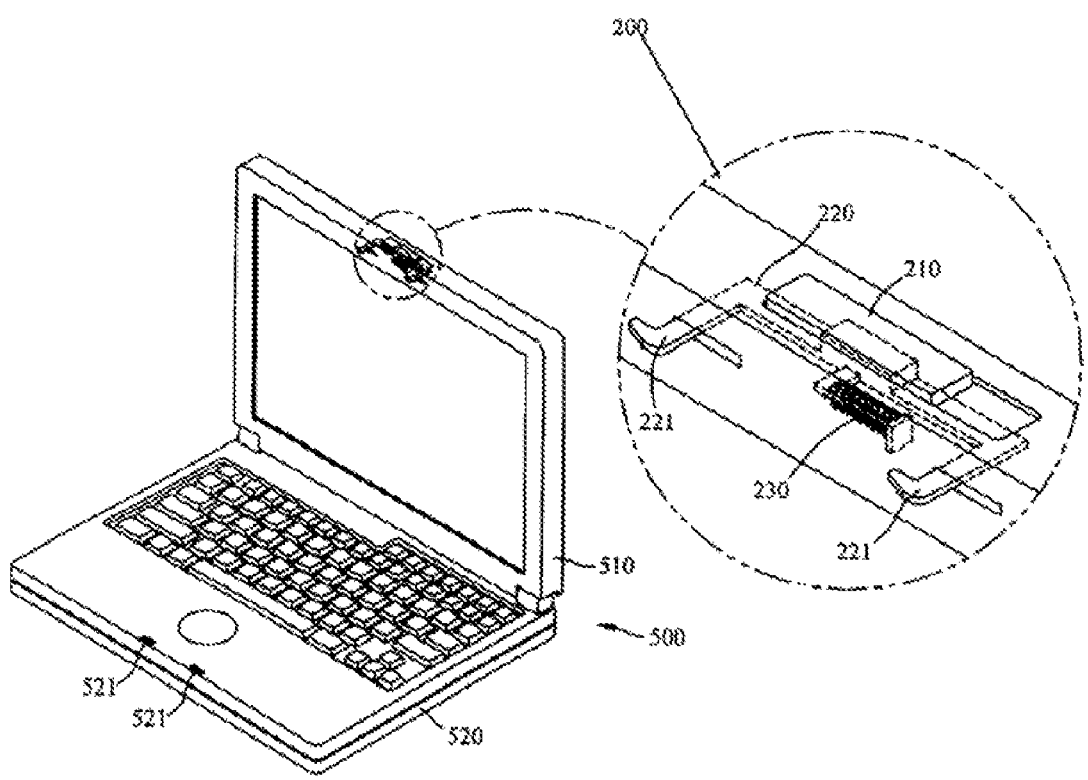
FIG. 7 is a schematic, isometric view of a conventional notebook computer and a conventional lock device assembled on the notebook computer.

Referring to FIG. 6, in order to open the display unit 11, move the plate 151 of the actuator 150 in the direction A to drive the rotatable bolt 140 to rotate. Correspondingly, the latch tenons 144 rotate to a second direction C. The second direction C is parallel to the long sides of the opening of the notch 13. Then the latch tenons 144 can slide free of the notch 13 and the display unit 11 can be opened from the main body 12.

It is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A lock device located on a display unit of a foldable electronic apparatus comprising:
   a rotatable bolt rotatably mounted on the display unit, defining a bolt holding groove at a side thereof and comprising two latch tenons;
   an actuator reciprocatingly movable; and
   an elastic bolt holder comprising a holder body for enclosing the rotatable bolt, a hook extending inwardly from an end of the body for wedging into the bolt holding groove in order to engage the elastic bolt holder with the rotatable bolt, and a portion extending from an opposite end of the holder body adapted to be attached to the actuator, for keeping the rotatable bolt at a first direction; wherein
   a movement of the actuator causes the rotatable bolt to rotate from the first direction to a second direction in order to lock or unlock the apparatus.

2. The lock device of claim 1, wherein each latch tenon forms a sloped surface on an outer side thereof.

3. The lock device of claim 1, wherein the rotatable bolt defines a pivot hole at a bottom thereof.

* * * * *